Patented Apr. 7, 1953

2,634,238

UNITED STATES PATENT OFFICE 2,634,238

CALCIUM HYPOCHLORITE DETERGENT COMPOSITION

Edward C. Soule, Niagara Falls, N. Y., assignor to Mathieson Chemical Corporation, a corporation of Virginia No Drawing. Application February 1, 1950, Serial No. 141,835

5 Claims. (Cl. 252—99)

My invention relates to the production of improved calcium hypochlorite detergent compositions having particular usefulness for rug cleaning. In a particular aspect it concerns the production of dry, safe and readily handled calcium hypochlorite and detergent compositions which have satisfactory stability in the dry form and which dissolve in water to produce clear solutions of strong detergent and valuable disinfectant power. Calcium hypochlorite has long been used in various types of commercial and household sanitizing compositions. In the rug-cleaning field it has been established as a valuable component of both plant and location type shampoo mixes. Its use, however, has been accompanied by closely related problems of stabilization of the dry detergent mix, avoidance of sludge and development of safe but effective detergent solutions. Although a dry, stabilized anhydrous calcium hypochlorite is more readily produced than any other hypochlorite, its use with the new synthetic organic detergents creates additional problems of stabilization against serious loss of available chlorine by decomposition. Its use in aqueous solution with alkali metal detergents results in copious precipitates of insoluble calcium salts.

Rug cleaning demands difficult-to-obtain qualities of strong detergent and wetting action without harmful chemical action on the material being cleaned for useful detergent compositions. Early methods of rug cleaning utilizing calcium hypochlorite required a two-tank arrangement for preparing and feeding soap solution from one tank and a solution of alkaline hypochlorite from the second tank. This system was necessary to produce a sodium hypochlorite solution which would avoid deposition of difficultly removable sludge or precipitate of calcium salts in the rug fabric. Thus the hypochlorite was obtained in the form of a dry mixture of calcium hypochlorite and sodium carbonate which was mixed with the desired quantity of water in a settling tank so that the resulting calcium carbonate sludge was settled off prior to use of the aqueous solution in rug cleaning. Later it was discovered that a synthetic detergent could be incorporated in the calcium hypochlorite and soda ash mix so that the steps of separate preparation of soap and hypochlorite solutions could be eliminated, but it was still necessary to utilize a specially equipped mixing and settling tank to prepare the solution. Various polyphosphate sequestering agents were tried to overcome sludging, but, effective as those agents are in sequestering calcium salts, it was not possible to produce an all-in-one calcium hypochlorite mixture that would result in clear, non-sludging aqueous solutions. The problem of sludging was further complicated by the problem of stabilizing the dry hypochlorite mixture against decomposition and undue loss of available chlorine content. As is well known, dry calcium hypochlorite and soda ash mixtures in initially stable form can be prepared by employing a substantially anhydrous calcium hypochlorite produced by a method minimizing calcium chloride contamination. Even these mixtures suffer decomposition in use, however, as the mix tends to pick up small quantities of water from the air under conditions of day-to-day use. The newer compositions incorporating synthetic detergents created a further problem in stabilization because it is not ordinarily possible to obtain these materials in a completely dry state. As a result it has become usual to incorporate calcium oxide in the dry hypochlorite mixtures because of its compatibility with the ingredients of the mixture and its desiccant action. Calcium oxide, however, aggravates the sludging problem by increasing the proportion of calcium ions available upon solution and in terms of detergent utility represents an inert diluent. It has been thought to be a necessary ingredient in such mixtures, however, because of its value in reducing chlorine loss.

Sodium carbonate has not been thought useful for hypochlorite stabilization in the art because of its ready reaction with the hypochlorite in the presence of any moisture. I have now discovered that finely divided anhydrous potassium carbonate is effective in stabilizing calcium hypochlorite and detergent compositions and has special advantages compared to other stabilizers. Potassium carbonate is water soluble and when it is used to stabilize calcium hypochlorite compositions, a polyphosphate sequestering agent may be employed successfully so as to result in clear solutions of the mixture in water. It produces dry mixtures of high stability at the same time and has the special advantage that the same care need not be exercised as with calcium oxide in eliminating substantially all water of hydration from the dry mixture. Further, the water solutions produced according to my invention have better washing ability, perhaps due to the mixture of sodium and potassium salts present. For example, compositions according to my invention in general produce a more stable suds in much greater volume.

According to my invention, finely divided potassium carbonate is compounded with the mixture in substantial excess of the amount required to combine with all hydrate water present in the mixture to form $K_2CO_3 \cdot 1\frac{1}{2}H_2O$. A proportion of twice the theoretical is ordinarily quite satisfactory, but under probable conditions of protracted storage or intermittent use, as much as five times the theoretical may be desirable. The incorporation of such substantial excesses of potassium carbonate is further advantageous in building the detergency of resulting solutions. A commercial grade of potassium carbonate or pearl ash may be employed with its usual traces of water, but the material should be substantially anhydrous. It should be finely divided. In one satisfactory example, about 70% passed a 200-mesh screen. In this form the potassium carbonate acts quickly and energetically to take up water present or to offset pickup of moisture from the air.

I have also prepared hypochlorite containing rug-cleaning detergent compositions employing sodium monoxide as a desiccant. Sodium monoxide, however, is difficult to subdivide to the point where it functions effectively as a desiccant and its extreme reactivity with water is apt to be hazardous. Further, rug-cleaning detergents should produce solutions of relatively low pH, say about 9 to 10 pH, in order not to injure the fabric or deteriorate the tensile strength of the woolen fabrics. Thus rug-cleaning detergent compositions are able to accommodate only limited proportions of sodium monoxide as a desiccant. Compared to sodium bicarbonate, sodium monoxide is a strong alkali. It reacts, for example, with it, if any moisture is present, and with polyphosphates to produce monophosphates. Potassium carbonate, on the other hand, tends to set up a buffer system with sodium bicarbonate present which acts to maintain the desired pH. Potassium carbonate also has an initial lower alkalinity so that larger proportions of it can be introduced without damage to the wool fibers of the rugs treated. Even more significantly potassium carbonate possesses the special advantage of accomplishing effective stabilization of mixtures containing small quantities of hydrate water and has the capacity of offsetting pickup of moisture from the air, whereas sodium monoxide or calcium oxide for best effectiveness require a substantially anhydrous mixture.

The new compositions according to my invention are mixtures comprising a solid calcium hypochlorite of high purity, a synthetic organic detergent salt, a polyphosphate, and anhydrous potassium carbonate. In addition, other components may be present including diluent inorganic salts, particularly sodium chloride and usually a major porportion of alkali metal carbonates or bicarbonates or both.

The calcium hypochlorite which I prefer to use in the product of the present invention is one which is a stable product high in available chlorine and low in calcium chloride. Characteristically, this hypochlorite contains upwards of 50% available chlorine, and with particular advantage, upwards of 60%. The free lime content is preferably maintained at a low value. The calcium hypochlorite referred to herein as useful in my product is not to be confused with the conventional bleaching powder or chlorinated lime from which it differs materially both as to chemical constitution and its exceptionally high content of available chlorine. As examples of calcium hypochlorite products suitable for use in the composition of the present invention may be mentioned the products whose preparation is described in U. S. Patents Nos. 1,481,039; 1,481,040; 1,713,650; 1,713,654; 1,713,668 and 1,713,669. The term "calcium hypochlorite" as used herein refers to a product having the properties just described. The high stability which such a hypochlorite product possesses is particularly advantageous in the mixed product of the present invention since it permits storage for considerable periods without decomposition. Its stability is due in part to its low content of calcium chloride which at most should not exceed about 10% of the hypochlorite product and preferably should not exceed 2–3%. When this salt, which is very hygroscopic, is present in substantial amount, it not only makes the product difficult to keep dry but also decreases the stability of the product due to the hydrolysis occasioned by the absorbed water.

The materials referred to above broadly as "synthetic organic detergent salts" may include a wide variety of organic compounds having strong detergent and wetting action. The organic or non-polar groups of these detergent compounds include a wide variety of organic groups. In addition to carbon, hydrogen and oxygen, these groups may contain sulfur or nitrogen or other elements commonly associated with them in organic compounds. Such groups include saturated hydrocarbons, ethers, primary and secondary alcohols, higher alcohols, ketones and esters. These groups may furthermore contain aromatic or heterocyclic ring structures. The polar groups contained in the detergents used in my invention are more limited in number. They are, in most cases, di- or polybasic acids of sulfur or phosphorus, the sulfur containing acid groups occurring usually as sulfate or sulfonate. The cations which form the salts with the acid groups in these compounds include the alkali metals, the alkaline earth metals and the ammonium ion. The ammonium ion may also constitute the salt-forming ion as, for example, in a quaternary ammonium salt. The non-polar groups mentioned above usually form anions in solution but the non-polar groups in quaternary ammonium compounds form cations in solution. Salts of sulfated higher alcohols are generally useful as detergents in the herein described mixtures. An example of another class of satisfactory detergent compounds are the salts of sulfonated long-chain compounds. These are distinguished from the sulfates referred to by the fact that the sulfonic groups is attached directly to a hydrocarbon group whereas the alcohol sulfates are in reality sulfuric acid esters of the alcohols. Specific examples of synthetic organic detergent salts, useful in the compositions of my invention, are sodium lauryl sulfate, sodium lauryl sulfonate, sodium ethylene palmitate sulfonate, sodium ethylene methyl lauramide sulfonate, palmityl trimethyl ammonium chloride, lauryl pyridinium chloride, nonyl naphthalene sulfonate, cetyl trimethyl ammonium bromide and lauryl benzyl dimethyl ammonium chloride. Soaps react alkaline in water solution and form insoluble compounds with the alkaline earth metals. Under the same conditions, the water-soluble detergents of the present invention do not form such insoluble compounds. They produce substantially neutral aqueous solutions apparently owing to the fact that their solubilizing groups are more strongly acidic than the carboxyl group in soap with the result that their metallic salts are more nearly neutral. These detergent compounds therefore do not contain the carboxyl group as such but may contain it in a muzzled form, for example, as an ester grouping. By the phrase "synthetic organic detergent salt" as used in this application, and in the claims, I refer to a detergent compound of the above-referred to types, and I intend to exclude organic compounds which may be classified as soaps which give a strong alkaline reaction in aqueous solution and which precipitate insoluble compounds with the alkaline earth metals.

In accordance with my invention, I further incorporate appropriate amounts of an alkali metal polyphosphate, particularly tetrasodium pyrophosphate, disodium dihydrogen pyrophosphate, sodium tripolyphosphate, and also potassium tripolyphosphate as sequestering agent for the minor amount of calcium carbonate formed on dissolving these compositions in water. In the past as noted above, it has been necessary in using compositions of the type described to dissolve them in water and allow the reaction to form calcium carbonate from the calcium hypochlorite and soda ash to proceed, to allow the calcium carbonate sludge to settle and to decant the supernatant liquid for use. In my potassium carbonate stabilized and polyphosphate containing compositions, the necessity of the settling and decanting steps is avoided, and the mixture on dissolving in water gives a clear or only slightly cloudy suspension which may be used directly without settling, decanting or filtering.

Of the common polyphosphates, the alkali metal hexametaphosphates are the most effective sequestering agents for relatively insoluble calcium salts and they are the least alkaline. The pyrophosphates are the most alkaline but are relatively less effective sequestering agents. In these respects the tripolyphosphates and tetraphosphates are intermediate. Their use is especially advantageous in my products. However, it is possible to control the alkalinity of the compositions when dissolved in water by adjusting the proportion of carbonate to bicarbonate in the composition. Thus sufficient proportions of the cheaper pyrophosphate may be used to provide satisfactory sequestration and the alkalinity may be adjusted by the use of larger proportions of bicarbonate to carbonate.

The mixture of this invention may also include inert diluent salts particularly sodium chloride for the purpose of adjusting the available chlorine content to a particular limit. When incorporating salt or polyphosphates, particularly the less alkaline polymetaphosphates, it is usually advantageous to admix soda ash or add the potassium carbonate with the calcium hypochlorite before adding the salt or polymetaphosphate to the mixture.

The relative proportions in which the various components are present in the salt mixtures of my invention may vary. In practical operation, the desirable available chlorine content of the mixture is predetermined and the mixture dissolved in water in an amount predetermined to be necessary to effect the desired degree of detergency and other valuable functions. When the mixture is dissolved in water in a suitable container, the calcium of the hypochlorite reacts with the pearl and soda ash but the calcium carbonate formed thereby is sequestered by the polyphosphate content and does not precipitate. Sometimes a slight cloud is formed in the solution but this is not objectionable. An amount of alkali carbonate more than equivalent to the calcium ion present should be in the original mixture. I have found that the excess potassium or mixed potassium and sodium salts which remain in the solution impart improved detergent-building qualities. In many cases it is desirable to have the solutions used in a lower pH range. The pH value which would be imparted to the solution by the excess alkaline metal carbonates may be lowered by incorporating in the dry mixture a predetermined proportion of sodium bicarbonate, for example sufficient bicarbonate to reduce the pH to a value between 9 and 10. The relative amount of organic detergent incorporated in the mixture is governed by the amount of detergent and wetting action desired in the specific operation for which the mixture is to be employed. In general I have found that dry mixtures containing about 5–20% by weight of the active organic detergent salt admixed with inorganic salts are satisfactory. Such mixtures represent the usual commercial organic detergent containing, for example, 40% detergent and 60% $Na_2SO_4$ in the total mixture of 10–50%. Tests which I have conducted indicate that solutions of salt mixtures when the components are within these concentration limits approach closely a maximum penetrating or wetting ability.

The proportions of the above identified and described components which are used in my composition are more specifically defined as follows. I use about 0.5 to 8 parts of high test calcium hypochlorite and preferably about 1–5 parts thereof. The total alkali metal carbonate content is usually about 10–20%, and includes and requires more than sufficient potassium carbonate to combine with all water present, usually about 3 to 20 parts or more and preferably about 12 to 16 parts. Sodium bicarbonate may be incorporated as desired in the composition to adjust the pH and may amount to as much as 25 parts or more but I prefer to use not over about 25 parts in most instances. However, as pointed out above, the bicarbonate content may be substantially absent from the composition when it is desired to obtain a more alkaline detergent. The polyphosphate content of the mixture amounts to about 5 to 20 parts by weight, preferably about 7–18 parts by weight. Of the synthetic organic detergent, I use about 5 to 20 parts of the active material, preferably about 9–18 parts. As noted above, there is often sodium sulfate or other inorganic salt present in proportion to the content of synthetic detergent since the latter is usually supplied as an admixture with sodium sulfate which may contain, for example, about 60% of the inorganic material. Minor amounts, suitably 0.1 to 0.5 part by weight of inorganic coloring matters stable to hypochlorite may be utilized. For this purpose, I have found ultramarine useful.

*Example I*

One example of a composition which is suitable for plant shampooing of rugs follows:

| | Per cent |
|---|---|
| High test calcium hypochlorite | 5 |
| Soda ash | 5 |
| Potassium carbonate | 12 |
| Sodium bicarbonate | 25 |
| Tetrasodium pyrophosphate | 18 |
| Sodium lauryl sulfate | 14 |
| Sodium sulfate | 21 |
| Ultramarine blue | 0.2 |
| | 100 |

*Example II*

Another example of a composition illustrative of a type useful for plant shampooing of rugs is as follows:

| | Per cent |
|---|---|
| High test calcium hypochlorite | 5.0 |
| Soda ash | 4.6 |
| Potassium carbonate | 12.0 |
| Sodium bicarbonate | 25.1 |
| Sodium tripolyphosphate | 18.0 |
| Fatty alcohol sulfate or alkyl aryl sulfonate | 14.0 |
| Ultramarine blue | .3 |
| Sodium sulfate | 21.0 |
| | 100.0 |

*Example III*

A sample of a composition which is suitable as a location type rug cleaning compound is as follows:

| | Per cent |
|---|---|
| High test calcium hypochlorite | 1.0 |
| Soda ash | 2.8 |
| Potassium carbonate | 14.0 |
| Sodium bicarbonate | 25.0 |
| Sodium tripolyphosphate | 7.0 |
| Fatty alcohol sulfate or alkyl aryl sulfonate | 20.0 |
| Ultramarine blue | .2 |
| Sodium sulfate | 30.0 |
| | 100.0 |

As compared with the detergents of the prior art, these compositions contain calcium hypochlorite as sterilizing agent but have improved stability and produce substantially no insoluble material on dissolving in water. No residual powder remains after use in the dissolving tank or on the rug. Although my products are prepared in powdered form, it often is desirable to market them in granular form. A small amount of insoluble material may form a cloudy suspension in some instances, but in no case is this objectionable in amount and is not settled out before use. The compositions, for this reason, show improved detergency and sudsing properties, often producing about twice the amount of suds as previously known compositions of this type. Furthermore, the suds are longer lasting and more effective.

I have found that the compositions of my invention are particularly useful in the art of rug cleaning. Their use makes possible an efficient and simple one-step process for the cleaning of rugs, carpets and other fabrics. In the past, rugs have customarily been subjected to a shampooing preceded by beating and vacuum treatments and followed by cumbersome rinsing and drying steps. One of the greatest difficulties encountered was the loosening and complete removal of the adhesive dirt held at the base of the pile by soot and other greasy materials which collect in such a fabric with constant use. Complete removal was seldom accomplished in actual rug cleaning practice. A further major difficulty was the complete elimination of soap solution from the rug and particularly from the base of the pile after shampooing. Because of this failure to remove the soap completely, it remained as a coating on the fibers thus increasing the tendency of dust particles to adhere to the fiber in such a way that ordinary cleaning methods including the use of vacuum cleaners failed to remove such dirt. In addition, the soap residue frequently became sticky, thus preventing the pile from regaining its fresh, springy appearance. Such difficulties are overcome, and in addition the before-mentioned improvements are attained by the use of my compositions. The increased solubility of the mixture facilitates the removal of the reagents from the fabric thus eliminating extensive rinsing operations. The freedom of the mixture from sludge materially improves the appearance of the fabric after cleaning. The loss of substantial proportions of cleansing agent accompanied by the precipitation of insoluble soaps, when hard waters are used, is avoided. The increased wetting and penetrating action of the solutions prepared from the mixtures of the present invention result in increased efficiency of soil removal and time of reaction as compared to the results obtained by the use of soaps. In the case of fabrics having a sheen finish the original sheen is restored. The color of the fabric is freshened and the designs clarified. Stains are removed and the fabric is efficiently deodorized and disinfected.

I claim:

1. A dry, stable detergent composition consisting essentially of about 0.5 to 8 parts by weight of calcium hypochlorite containing upwards of about 50% available chlorine, about 3 to 20 parts by weight of finely divided substantially anhydrous potassium carbonate, about 5 to 20 parts by weight of a sodium polyphosphate, and about 5 to 20 parts by weight of a synthetic water soluble organic detergent selected from the group consisting of sulfates, sulfonates and quaternary ammonium salts which do not produce an insoluble precipitate in the presence of calcium ions.

2. The composition of claim 1 which contains from a small proportion to about 25 parts by weight of sodium bicarbonate.

3. The composition of claim 1 in which the polyphosphate is sodium tripolyphosphate.

4. The composition of claim 1 in which the polyphosphate is tetrasodium pyrophosphate.

5. The method of producing a stable, dry detergent and hypochlorite composition which is substantially completely soluble in water, which comprises incorporating in a mixture of about 0.5 to 8 parts by weight of calcium hypochlorite containing upwards of about 50% available chlorine and about 5 to 20 parts by weight of a synthetic water soluble organic detergent selected from the group consisting of sulfates, sulfonates and quaternary ammonium salts which do not produce an insoluble precipitate in the presence of calcium ions, about 5 to 20 parts by weight of a sodium polyphosphate, and about 3 to 20 parts by weight of finely divided substantially anhydrous potassium carbonate and in substantial excess of the amount necessary to combine with all hydrate water in the mixture.

EDWARD C. SOULE.

REFERENCES CITED

The following references are of record in the file of this patent:

UNITED STATES PATENTS

| Number | Name | Date |
|---|---|---|
| 2,320,279 | Kalusdian | May 25, 1943 |
| 2,415,657 | Riggs et al. | Feb. 11, 1947 |

FOREIGN PATENTS

| Number | Country | Date |
|---|---|---|
| 469,334 | Great Britain | July 23, 1937 |